F. W. SPACKE, D. T. BROWNLEE & W. SPACKE.
CRANK SHAFT.
APPLICATION FILED JAN. 28, 1914.

1,136,376.

Patented Apr. 20, 1915.

WITNESSES:
Frank A. Fahle
Josephine Gasper

INVENTORS
Fred W. Spacke,
Dalmar T. Brownlee,
William Spacke.
BY
Arthur M. Hood
ATTORNEY

UNITED STATES PATENT OFFICE.

FRED W. SPACKE, DALMAR T. BROWNLEE, AND WILLIAM SPACKE, OF INDIANAPOLIS, INDIANA, ASSIGNORS TO THE F. W. SPACKE MACHINE COMPANY, OF INDIANAPOLIS, INDIANA, A CORPORATION OF INDIANA.

CRANK-SHAFT.

1,136,376.      Specification of Letters Patent.      Patented Apr. 20, 1915.

Original application filed January 13, 1913, Serial No. 741,719. Divided and this application filed January 28, 1914. Serial No. 815,081.

*To all whom it may concern:*

Be it known that we, FRED W. SPACKE, DALMAR T. BROWNLEE, and WILLIAM SPACKE, all citizens of the United States, residing at Indianapolis, in the county of Marion and State of Indiana, have invented a new and useful Crank-Shaft, of which the following is a specification.

Our invention relates to a crank shaft and fly wheel construction, as for engines, and has for its object the provision of a crank shaft and fly wheels which shall be at once strong and compact, easily assembled, well lubricated, and balanced in operation.

This application is a division of our co-pending application, Serial No. 741,719, filed January 13, 1913.

The accompanying drawings illustrate our invention.

Figure 1:
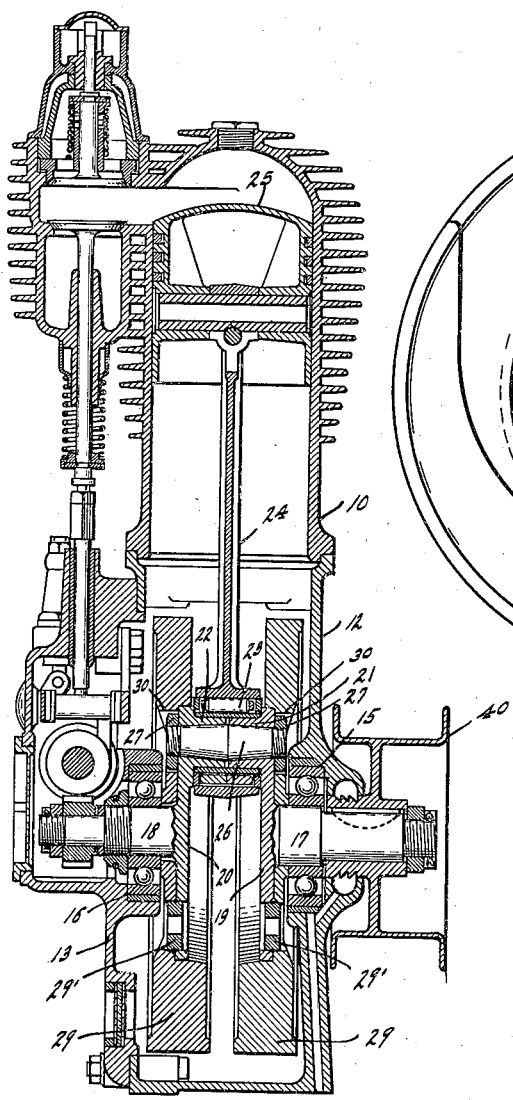
Figure 2:
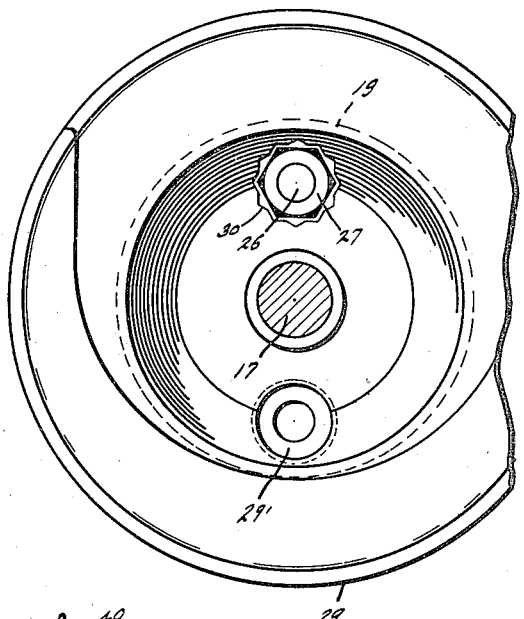

Figure 1 is a vertical longitudinal section through an engine embodying our invention; and Fig. 2 is a fragmentary side elevation of one of the fly wheels, showing how it serves as a nut lock.

The cylinder 10 is set on top of the crank case 12, shown as having a removable end cover 13. The crank case 12 and its cover 13 carry ball bearings 15 and 16, in which is mounted the crank shaft embodying our invention.

This crank shaft has two stub shaft portions 17 and 18, provided at their respective adjacent ends with spaced disks 19 and 20 having eccentric projections 21 and 22 on their adjacent faces. These projections are cylindrical exteriorly and together form a support for a roller bearing 23 on which is mounted the crank end of a pitman 24; the other end of which is connected to a piston 25 in the cylinder 10. The projections 21 and 22 are bored out so that they are tapered interiorly, the large ends being toward each other or at the adjacent ends of the projections. Within the projections is mounted a doubly tapered bolt 26, screw-threaded at both ends to receive nuts 27 whereby the projections 21 and 22 may be clamped together on the bolt 26 and the disks 19 and 20 and their stub shafts 17 and 18 all will be held in proper relative positions. Suitably mounted on the disks 19 and 20 are two fly-wheel disks 29, which are held against rotation by dowel disks 29' and are provided with suitably notched perforations 30 which fit loosely over the nuts 27 and act as nut-locks therefor. On the end of the crank shaft may be mounted a suitable pulley 40, or other power-transmitting device. The fly wheel disks 29 are heaviest opposite the projections 21 and 22, to provide proper balancing.

We claim as our invention:

1. A crank shaft comprising two alined stub shafts provided with disks at their adjacent ends, the adjacent faces of said disks having alined eccentric projections substantially parallel to the shaft axis, said projections being bored out taperingly with the large end in each projection toward the other projection, and a double ended doubly tapered bolt fitting in the bores of the projections and provided with nuts whereby the two parts of the shaft may be clamped together.

2. A crank shaft comprising two alined stub shafts provided with disks at their adjacent ends, the adjacent faces of said disks having alined eccentric projections substantially parallel to the shaft axis, said projections being bored out and the bore in each projection being larger at the end toward the other projection than at the end remote therefrom, and a double ended bolt larger at the middle than at the ends and fitting in the bores of the projections and provided with nuts whereby the two parts of the shaft may be clamped together.

3. A crank shaft comprising two alined stub shafts provided with disks at their adjacent ends, the adjacent faces of said disks having alined eccentric projections substantially parallel to the shaft axis, said projections being bored out, a double ended bolt fitting in the bores of the projections and provided with nuts whereby the two parts of the shaft may be clamped together, and fly wheels mounted on said disks and provided with holes fitting over said nuts to lock them against rotation.

In witness whereof, we have hereunto set our hands at Indianapolis, Indiana, this twenty-sixth day of January, A. D. one thousand nine hundred and fourteen.

FRED W. SPACKE.
DALMAR T. BROWNLEE.
WILLIAM SPACKE.

Witnesses:
F. S. LAWRIE,
H. O. PERINE.